US010699304B1

(12) United States Patent
Mysen

(10) Patent No.: US 10,699,304 B1
(45) Date of Patent: Jun. 30, 2020

(54) DELIVERY AND ADVERTISEMENTS TO MOBILE APPLICATIONS

(75) Inventor: Clarence Christopher Mysen, San Francisco, CA (US)

(73) Assignee: Google LLC, Mountain View, CA (US)

( * ) Notice: Subject to any disclaimer, the term of this patent is extended or adjusted under 35 U.S.C. 154(b) by 931 days.

(21) Appl. No.: 13/179,104

(22) Filed: Jul. 8, 2011

(51) Int. Cl.
*G06Q 30/02* (2012.01)

(52) U.S. Cl.
CPC ..... *G06Q 30/0261* (2013.01); *G06Q 30/0259* (2013.01); *G06Q 30/0269* (2013.01); *G06Q 30/0251* (2013.01)

(58) Field of Classification Search
None
See application file for complete search history.

(56) References Cited

U.S. PATENT DOCUMENTS

| 6,134,532 A | 10/2000 | Lazarus et al. | |
|---|---|---|---|
| 2003/0037041 A1 | 2/2003 | Hertz | |
| 2007/0244750 A1* | 10/2007 | Grannan | G06Q 30/02 705/14.64 |
| 2008/0133336 A1* | 6/2008 | Altman | G06Q 30/0207 455/456.1 |
| 2008/0228600 A1* | 9/2008 | Treyz | G06Q 20/12 705/26.43 |
| 2009/0024476 A1* | 1/2009 | Baar | G06Q 30/02 705/14.53 |
| 2010/0094878 A1* | 4/2010 | Soroca | G06Q 30/02 707/748 |
| 2011/0055008 A1 | 3/2011 | Feuerstein et al. | |
| 2011/0137818 A1* | 6/2011 | Goad | G06Q 30/02 705/347 |
| 2011/0173059 A1* | 7/2011 | Benson | G06Q 30/02 705/14.24 |
| 2012/0095837 A1 | 4/2012 | Bharat et al. | |

(Continued)

FOREIGN PATENT DOCUMENTS

WO 2004/111771 A2 12/2004

OTHER PUBLICATIONS

U.S. Appl. No. 13/178,917 to Mysen filed Jul. 8, 2011.

(Continued)

*Primary Examiner* — John Van Bramer
(74) *Attorney, Agent, or Firm* — Fish & Richardson P.C.

(57) ABSTRACT

A content provider can provide content, such as advertisements or other promotional material, for display by a mobile application. As contextual information is typically limited for mobile applications, the content provider can use other information in addition to or in place of contextual information to select advertisements. This information can include location information, user activity with regards to the mobile application, information regarding a recipient of the advertisement, such as demographic information, information regarding the mobile application, such as information regarding the type of mobile application, and product inventory information. A user profile also may be used to select advertisements. The user profile can include a set of merchants and merchant types, for example clothing retailers, to which a user may be more responsive. The user profiles can be generated and updated by logging merchants that the user visits or interacts with via advertisements.

29 Claims, 3 Drawing Sheets

(56) References Cited

U.S. PATENT DOCUMENTS

| | | | |
|---|---|---|---|
| 2012/0245990 A1* | 9/2012 | Agarwal | G06Q 30/0202 705/14.25 |
| 2015/0019958 A1 | 1/2015 | Ying et al. | |
| 2018/0285953 A1 | 10/2018 | Mysen et al. | |

OTHER PUBLICATIONS

U.S. Appl. No. 13/179,075 to Mysen et al. filed Jul. 8, 2011.
Author: Van Bramer, J., Title: Office Action issued in copending U.S. Appl. No. 13/178,917, filed Jul. 8, 2011, pp. 1-11, dated Aug. 28, 2013.
U.S. Appl. No. 14/456,537 to Mysen filed Aug. 11, 2014.
Van Bramer, "Office Action issued in co-pending U.S. Appl. No. 13/179,055, filed Jul. 8, 2011", dated Jan. 28, 2015, 1-10.
Van Bramer, "Office Action issued in co-pending U.S. Appl. No. 13/179,075, filed Jul. 8, 2011", dated Dec. 19, 2014, 1-12.
Van Bramer, "U.S. Office Action issued in copending U.S. Appl. No. 13/179,055, filed Jul. 8, 2011", dated Aug. 26, 2015, 13 pages.
Van Bramer, "U.S. Office Action issued in copending U.S. Appl. No. 13/179,055, filed Jul. 8, 2011", dated Jun. 24, 2016, 17 pages.
Van Bramer, "Office Action issued in co-pending U.S. Appl. No. 13/179,075, filed Jul. 8, 2011", dated Jun. 1, 2015, 1-20.
U.S. Appl. No. 15/474,468 to Mysen et al. filed Mar. 30, 2017.
U.S. Appl. No. 13/179,055 to Mysen et al. filed Jul. 8, 2011.
U.S. Appl. No. 14/456,537 to Clarence Christopher Mysen filed Aug. 11, 2014.
Van Bramer, "U.S. Office Action issued in copending U.S. Appl. No. 13/179,055, filed Jul. 8, 2011", dated Dec. 30, 2016, 19 pages.
Van Bramer, "U.S. Office Action issued in copending U.S. Appl. No. 14/456,537, filed Aug. 11, 2014", dated Dec. 28, 2016, 21 pages.
Van Bramer, "U.S. Office Action issued in copending U.S. Appl. No. 14/456,537, filed Aug. 11, 2014", dated May 15, 2017, 20 pages.
Van Bramer, "U.S. Office Action issued in copending U.S. Appl. No. 14/456,537, filed Aug. 11, 2014", dated Nov. 16, 2017, 22 pages.
Van Bramer, "Office Action issued in copending U.S. Appl. No. 13/178,917, filed Jul. 8, 2011", dated Apr. 9, 2014, 1-13.
Abbas "U.S. Office Action issued in co-pending U.S. Appl. No. 15/474,468, filed Mar. 30, 2017", dated Jan. 10, 2019, 14 pages.
Antoine "U.S. Office Action issued in copending U.S. Appl. No. 15/474,468, filed Mar. 30, 2017", dated Jul. 10, 2019, 20 pages.

\* cited by examiner

DELIVERY AND ADVERTISEMENTS TO MOBILE APPLICATIONS

TECHNICAL FIELD

The present disclosure relates generally to delivering advertisements, and more particularly to methods and systems for selecting advertisements for presentation by mobile applications.

BACKGROUND

In many different environments, content providers want to distribute content to selected recipients. For example, merchants want to provide advertisements and promotional offers to customers that may be interested in their products or services. One such avenue for providing advertisements that is becoming increasingly popular is via mobile applications. For example, an online video game application may present advertisements to a user that is playing the video game using a mobile electronic device, such as a smartphone or tablet computer. The advertisement may be displayed somewhere along the perimeter of the display screen such that the advertisement does not interfere with the game itself.

In some instances, a content provider may rely on contextual information when making decisions regarding selections of advertisements to provide to a recipient. For example, advertisers often use a search query or content presented on a web page to select advertisements to present to a user. However, selecting advertisements for display by a mobile application can be problematic due to the lack of contextual information available as compared to search query or content based advertisement. Therefore, it is desirable to provide an improved mechanism for selecting advertisement and other content for delivery to mobile applications.

SUMMARY

In certain exemplary embodiments, a computer-implemented method for distributing content includes a computer receiving information regarding a location of a network device associated with a user and having thereon a mobile application module. The computer determines whether the location is at or near a merchant based on the information regarding the location of the network device. In response to determining that the network device is located at or near the merchant, the computer adds information regarding the merchant to a profile associated with the user of the network device. The computer receives, a request for an advertisement to be presented to the user associated with the profile. The computer selects an advertisement in response to the request for an advertisement. The selected advertisement is selected from available advertisements based on the merchant information in the profile. The computer transmits the information regarding the selected advertisement in response to the request for an advertisement.

In certain exemplary embodiments, a computer-implemented method for receiving content includes a computer, associated with a user, transmitting a request for content via a mobile application module. The computer receives content in response to the request for content and at least one advertisement. The at least one advertisement is selected from available advertisements based on information in a profile associated with the user. The profile information includes an identification of merchants which the user has previously visited based on location information provided by the computer. The computer presents the content and the at least one advertisement.

In certain exemplary embodiments, a computer-implemented method for storing information includes a computer receiving information regarding a location of a network device associated with a user. The computer determines whether the location is at or near a merchant based on the information regarding the location of the network device. In response to determining that the network device is located at or near the merchant, the computer adds information regarding the merchant to a profile associated with the user of the network device.

These and other aspects, objects, features, and advantages of the exemplary embodiments will become apparent to those having ordinary skill in the art upon consideration of the following detailed description of illustrated exemplary embodiments, which include the best mode of carrying out the invention as presently perceived.

DETAILED DESCRIPTION OF EXEMPLARY EMBODIMENTS

Overview

Figure 1:
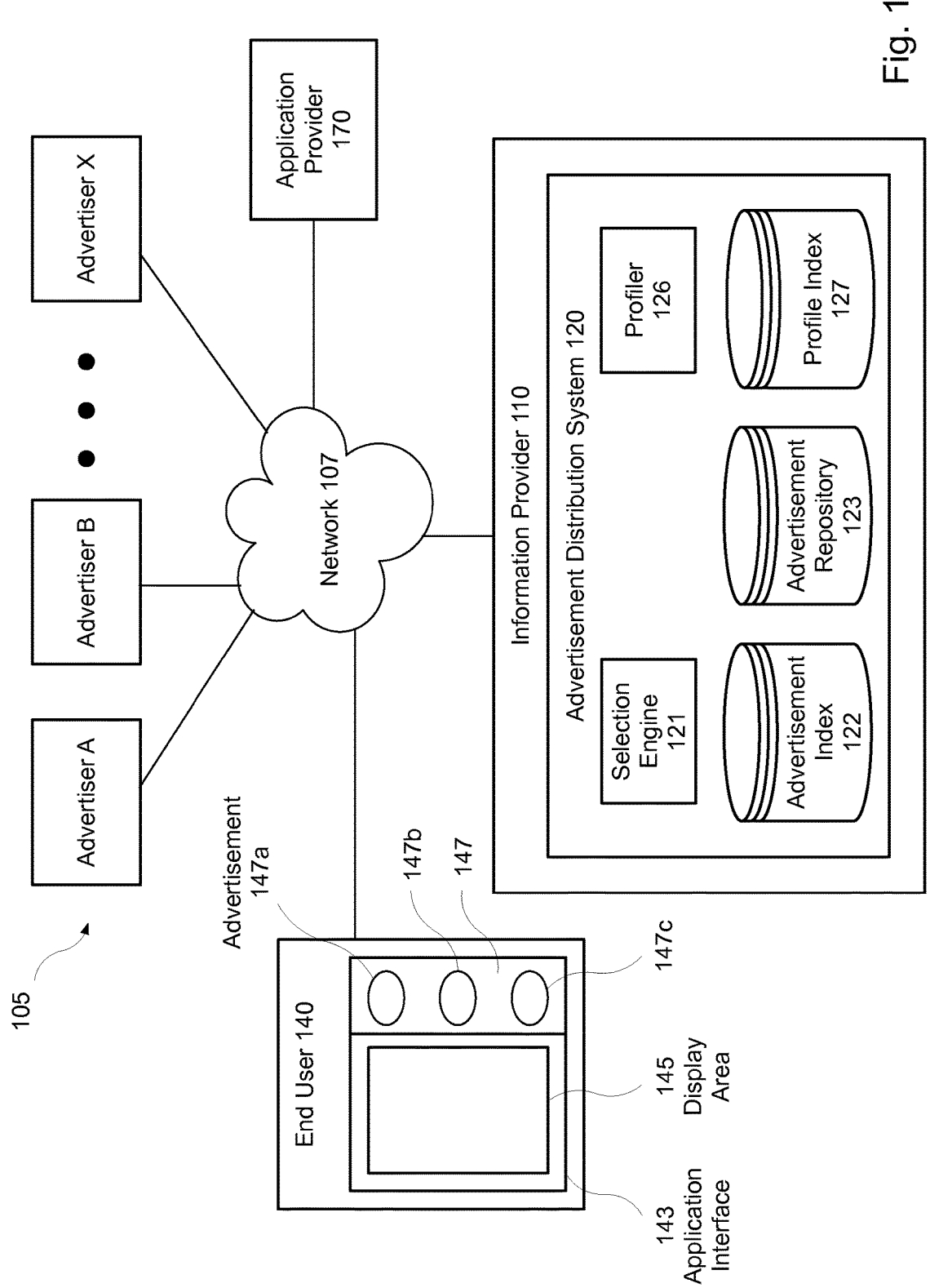
FIG. 1 is a block diagram depicting a system for providing content for presentation by a mobile application, in accordance with certain exemplary embodiments.

The methods and systems described herein enable a content provider to select and deliver advertisements or other content to a recipient via a mobile application. For the purpose of this specification, a mobile application is an application module executable by a mobile electronic device and having capabilities to interact with another computing device via a network. The system includes an advertisement distribution system, which is implemented in hardware and/or software. An advertisement selection engine of the advertisement distribution system selects from available advertisements or other content to provide to a recipient via the mobile application.

In certain exemplary embodiments, the advertisement selection engine selects from available advertisements based on information stored in a profile for the user. This information can include information regarding the mobile application, information regarding the user, information regarding locations the user has visited, including a list of merchants or other entities that the user has visited, information regarding a device of the user that hosts the mobile application, information regarding other applications or devices installed on the device, and/or information regarding how the user utilizes the device. A profiler module can use the profile information to generate a set of candidate merchants or other advertisers and use the set of candidate merchants to select advertisements to serve to the user. In addition to merchants, the list may contain a list of other advertisers that the user may be interested in receiving information from including, but not limited to, nonprofit organizations, charitable organizations, churches, schools, individuals, and events. For example, if a user often passes or navigates near a location of an event that may be of interest to a user, the profiler may add that event to the set of candidate merchants. When the user interacts with the mobile application, the advertisement selection engine may transmit an advertisement to the event to the user's device for display by the mobile application.

In certain exemplary embodiments, the user profile includes a list of merchants and/or other types of entities that the user has visited or has been determined to be near. In exemplary embodiments, a user may be considered to be "near" a merchant if the user is just outside the merchant's location, if the user is close enough to see the merchant's location, or if the user is within a predetermined distance of the merchant's location where the predetermined distance can be defined by a system operator as desired.

Users may be allowed to limit or otherwise affect the operation of the features disclosed in the specification. For example, users may be given opportunities to opt-in or opt-out of the collection or use of certain data or the activation of certain features. In addition, users may be given the opportunity to change the manner in which the features are employed, including for situations in which users may have concerns regarding their privacy. Instructions also may be provided to users to notify them regarding policies about the use of information, including personally identifiable information, and manners in which they may affect such use of information. Thus, sensitive personal information can be used to benefit a user, if desired, through receipt of relevant advertisements or other information, without risking disclosure of personal information or the user's identity.

One or more aspects of the exemplary embodiments may include a computer program that embodies the functions described and illustrated herein, wherein the computer program is implemented in a computer system that comprises instructions stored in a machine-readable medium and a processor that executes the instructions. However, it should be apparent that there could be many different ways of implementing the exemplary embodiments in computer programming, and the exemplary embodiments should not be construed as limited to any one set of computer program instructions. Further, a skilled programmer would be able to write such a computer program to implement an embodiment based on the appended flow charts and associated description in the application text. Therefore, disclosure of a particular set of program code instructions is not considered necessary for an adequate understanding of how to make and use the exemplary embodiments. The functionality of the exemplary embodiments will be explained in more detail in the following description, read in conjunction with the figures illustrating the program flow.

Turning now to the drawings, in which like numerals indicate like (but not necessarily identical) elements throughout the figures, exemplary embodiments are described in detail.

System Architecture

With reference to FIG. 1, a system 100 for providing content can be used to provide content to users of mobile applications. As depicted in FIG. 1, the system 100 includes network devices 105, 110, 140, and 170 that are configured to communicate with one another via one or more networks 107. Each network 107 includes a wired or wireless telecommunication means by which network devices (including devices 105, 110, 140, 170) can exchange data. For example, each network 107 can include a local area network ("LAN"), a wide area network ("WAN"), an intranet, an Internet, a mobile telephone network, or any combination thereof.

Throughout the discussion of exemplary embodiments, it should be understood that the terms "data" and "information" are used interchangeably herein to refer to text, images, audio, video, or any other form of information that can exist in a computer-based environment.

Each network device 105, 110, 140, 170 includes a device having a communication module capable of transmitting and receiving data over the network 107. For example, each network device 105, 110, 140, 170 can include a server, desktop computer, laptop computer, tablet computer, smartphone, handheld computer, personal digital assistant ("PDA"), or any other wired or wireless, processor-driven device. In the exemplary embodiment depicted in FIG. 1, the network devices 105, 110, 140, 170 are operated by advertisers, an information provider, an end user, and an application provider, respectively.

Each end user network device 140 includes at least one mobile application module having an application interface 143. The application interface 143 is operable to display content in a display area 145, such as content received from the application provider network device 170. Thus, each mobile application is capable of communicating with an application provider network device 170 associated with the mobile application. The application interface 143 is further operable to display advertisements 147a-147c, or other selected content, in a second area 147 of the application interface 143. In certain exemplary embodiments, the advertisements are selected from an advertisement repository 123, which is maintained by an advertisement distribution system 120 of the information provider network device 110.

In addition to the advertisement repository 123, the advertisement distribution system 120 includes an advertisement selection engine 121 that selects advertisements from available advertisements in the advertisement repository 123 for delivery to a user, an advertisement index 122 that stores information associated with the advertisements stored in the advertisement repository 123, a profiler 126, and a profile index 127.

The exemplary system 100 is described in more detail hereinafter with reference to the method illustrated in FIG. 2.

System Process

Figure 2:
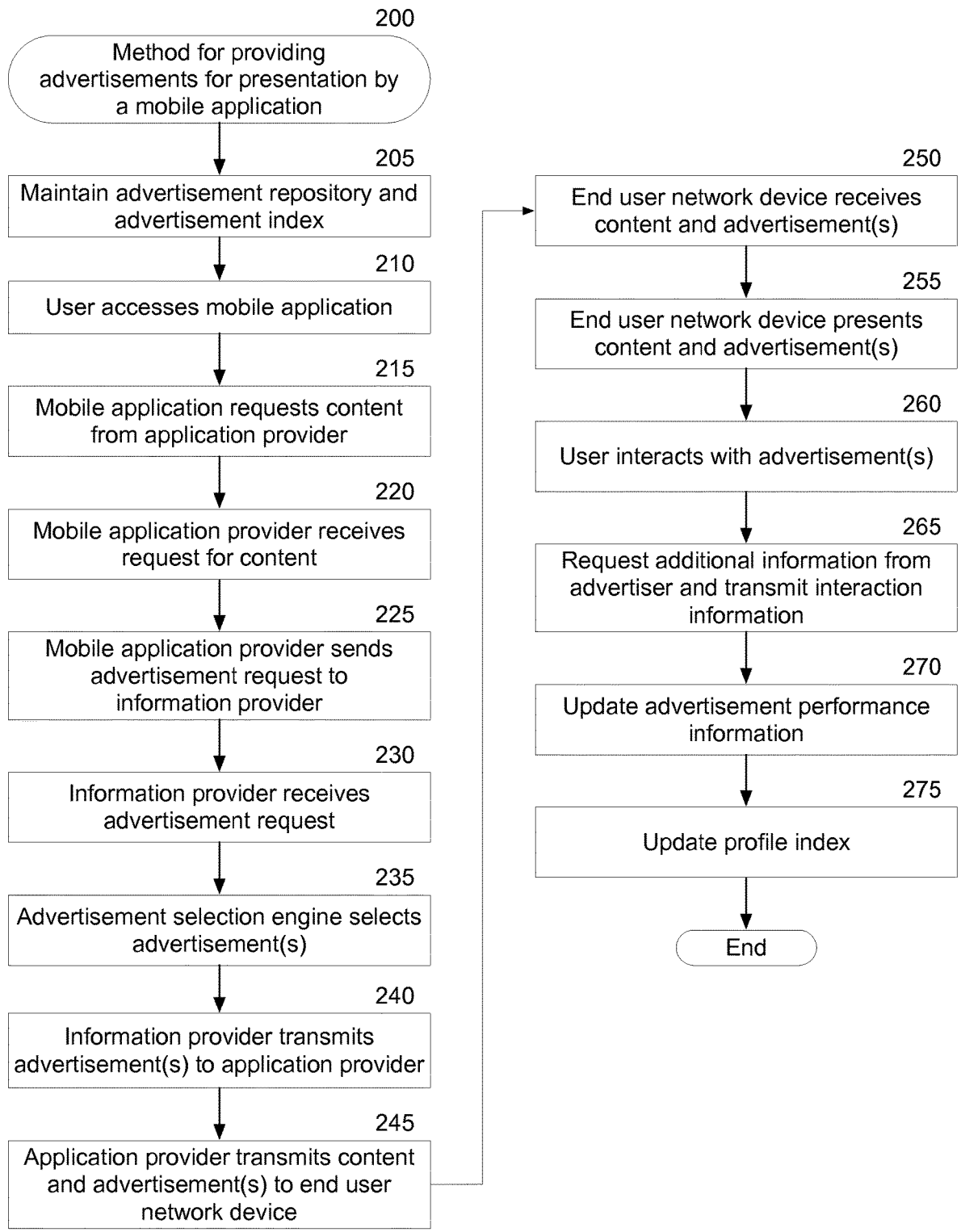
FIG. 2 is a block flow diagram depicting a method for providing an advertisement for display by a mobile application, in accordance with certain exemplary embodiments.

FIG. 2 is a block flow diagram depicting a method 200 for providing advertisements for display by a mobile application, in accordance with certain exemplary embodiments. The method 200 is described with reference to the components illustrated in FIG. 1.

In block 205, the advertisement distribution system 120 maintains the advertisement repository 123 and an advertisement index 122. The advertisement repository 123 includes a data structure, such as one or more databases and/or one or more electronic records, that includes advertisements. Alternatively, the advertisements are maintained by the respective advertisers, such as at one of the advertiser devices 105. The advertisements can include text, images, audio, video creatives, or any other form of information that can exist in a computer based environment. The advertisements can include any type of content, including coupons, discounts, offers, product ratings, product reviews, pricing information, inventory or availability of a product, product category information, a message, a public service announcement, information regarding an event, individual or other entity, or merchant location information, to name a few examples.

The advertisement index 122 also includes a data structure, such as one or more databases and/or one or more electronic records, that includes a list of the advertisements available in the advertisement repository 123 and information regarding the advertisements. This information regarding the advertisements can include, but is not limited to, advertisement performance information and criteria for providing the advertisement to a user. The advertisement performance information can include information regarding the advertisement's performance for certain mobile applications and/or information regarding the advertisement's performance for certain users. For example, the advertisement performance information can include clickthrough rates for an advertisement when the advertisement is presented to a user and/or a clickthrough rate for the advertisement when the advertisement is presented for particular mobile applications or categories of mobile applications. A clickthrough rate indicates how often an advertisement is selected in response to being presented.

The criteria for providing the advertisement can include information specifying mobile applications or categories of mobile applications to which to provide the advertisement, types of interaction with the mobile application in response to which to provide the advertisement, time periods to provide the advertisement, location information for providing the advertisement, and any other criteria for selecting advertisements. The advertisement index 122 also can include bid information identifying the bid price the advertiser 105 is willing to pay for the advertisement to be served to a recipient. The criteria also can include user profile criteria. For example, an advertiser can specify that an advertisement be sent to a user having certain information in their user profile.

In certain exemplary embodiments, the advertisement index 122 also includes, for each advertisement, information identifying a merchant or other entity associated with the advertisement and a category or type of merchant or entity. For example, merchant categories may include grocery stores, electronic retailers, restaurants, shoe stores, fueling stations, convenience stores, and any other type of merchant. For simplicity, the term merchant is used herein to refer to merchants, manufacturers, retailers, and others that sell products or services to customers. Additionally, as used throughout this specification, the term "product" should be interpreted to include tangible and intangible products, as well as services. Although the exemplary embodiments are largely described in terms of advertisements associated with merchants, the advertisements can be associated with other entities, such as non-profits, individuals, public service announcements, or charitable organizations.

In block 210, a user accesses a mobile application using the end user network device 140. For example, the user may actuate an icon displayed on a desktop interface of the end user network device 140. In response, the end user network device 140 initiates the mobile application and the mobile application presents the application interface 143 via a display screen of the end user network device 140.

In block 215, the mobile application accessed by the user sends a request for content to the application provider network device 170. The request for content can be in response to the user's interaction with the mobile application. For example, if the mobile application is a social networking application, a request for content may be transmitted in response to the user selecting a link to the user's messages or virtual wall. In another example, a financial account application may issue a request for content in response to the user selecting a link to account information. The request for content also may be made automatically, for example, in response to the user accessing the mobile application. For example, a weather application may transmit a request for the current weather at the user's current location in response to being accessed.

The mobile application can transmit additional information along with the request for content. For example, the mobile application may be configured to transmit information that can be used by the application provider network device 170 or the information provider network device 110 to select content, such as one or more advertisements to send to the end user network device 140. In certain exemplary embodiments, the mobile application can interact with other devices installed on or coupled to the end user network device 140 to obtain information.

In certain exemplary embodiments, the mobile application includes information associated with the mobile application with the request for content. This information associated with the mobile application can include, but is not limited to, a category for the mobile application, information regarding the user's current and/or historical interaction with the mobile application, and user login information for the mobile application. The request for content also can include current and/or historical location information for the end user network device 140 obtained from a global positioning system ("GPS") device (not shown) of the end user network device 140. For example, the GPS device or another device can log the user's locations and the mobile application can obtain this location log and transmit the log along with the request for content.

The request for content also can include information regarding the end user network device 140, such as information regarding other applications installed on the end user network device 140, the type and version of the end user network device 140, version information for the mobile application or the other applications installed on the end user network device 140, and capabilities of the end user network device 140. For example, if the end user network device 140 is a mobile telephone, the request may include version information for the phone and certain capabilities of the telephone.

In certain exemplary embodiments, the mobile application or another application installed on the end user network device 140 maintains a data file for the user and the request for content can include information from the user's data file. This data file may include the location log discussed above, information regarding social networking friends of the user, information contained in the user's contacts, and the user's reviews of locations that the user has visited. Other information also can be stored in the user's data file, such as the name and categories of the applications that the user interacts with, detailed information regarding the interactions with the applications, web browsing history, and information regarding how the user uses the end user network device 140, such as information identifying whether the user utilizes a data plan of a mobile telephone or information identifying whether the user plays games or listens to music using the end user network device 140. Of course, the user may be given the opportunity to opt-in or opt-out of the transmission and use of some or all of the aforementioned information that can be included with the request for content.

In block 220, the application provider 170 receives the request for content. In block 225, the application provider 170 transmits an advertisement request to the information provider network device 110. For example, the application provider 170 may transmit the advertisement request in response to the request for content. The advertisement request can include the information included in the request for content. For example, the advertisement request can include information regarding the mobile application that the user accessed, including the category for the mobile application, current application interaction information, and historical application interaction information. As an example of application interaction information, a social networking application may include in an advertisement request a list of merchants for which the user has indicated an affinity via the social networking application. As another example of application interaction information, a travel or weather application may include in the advertisement request information regarding a location the user has researched.

The advertisement request also can include certain information associated with the user. For example, the advertisement request may include demographic information, current location information, historical location information, and/or historical performance information obtained from prior advertisement selections for the user. Typically, the advertisement request does not include information that would identify the user. Instead, profile information, such as age and gender may be included in the advertisement request while the user's name or other identifying information is excluded to protect the user's privacy. Additionally, the user may specify what, if any, information may be provided in an advertisement request in certain exemplary embodiments.

The advertisement request also can include other information for use in selecting advertisements, such as information regarding a number and type of advertisements to select. For example, the area 147 of the application interface 143 may include space for three advertisements having a certain amount of text and a small image only. In this example, the application provider 170 may request three advertisements that include the desired content, namely text and an image.

In block 230, the information provider network device 110 receives the advertisement request. In block 235, the advertisement selection engine 121 of the advertisement distribution system 120 selects one or more advertisements from the advertisement repository 123 based on the information contained in the advertisement request. For example, the advertisement selection engine 121 selects a desired number of advertisements having a desired format based on the category for the mobile application, the user's interaction with the mobile application, information associated with the user, user location information, date and time information, advertisement performance information, criteria specified by the application provider 170, and/or other information included in the advertisement request.

The advertisement selection engine 121 also can select advertisements based on the information contained in a user profile of the user. The profiler 126, which can be implemented in hardware and/or software, maintains a user profile for a multitude of users in the profile index 127. The profile index 127 includes a data structure, such as one or more databases and/or electronic records, that store each user's profile. Each user profile can include a multitude of information regarding the user. This information can include information regarding merchants and types or categories of merchants that the user has visited or with which the user has interacted, for example, by interacting with one or more advertisements associated with the merchant.

Each user profile can include a list of merchants or other entities that the user associated with the user profile has visited or interacted with and the number of times that the user visited or interacted with each merchant. The list of merchants also may include particular merchant locations that the user visited and the number of times that the user visited each merchant location. The user profile also can include a list of merchant categories associated with the merchants that the user visited or interacted with and the number of times that the user visited or interacted with merchants in that merchant category. The list of merchants also can include merchants that the user has been located near.

As described in more detail in connection with FIG. 3, the profiler 126 can update the user profile with information regarding merchants that a user visits by comparing location information for an end user network device 140 associated with the user to location information for a multitude of merchants. If the end user network device 140 is at or near a merchant location, the profiler 126 may update the user's profile to reflect that the user visited that merchant. The profiler 126 also may log location information irrespective of merchant locations. For example, the profiler 126 may log GPS coordinates, city names, roads traveled on, or any other type of location information that can be obtained from the end user network device 140.

In certain exemplary embodiments, the location of a user may be obtained via near field communication ("NFC") check-in points. For example, a merchant may have an NFC check-in point that the user can place the end user network device 140 near to check-in. The NFC check-in point can then communicate information regarding the end user network device 140 to the information provider 110 and the profiler 126 can update the user's profile to indicate that the user visited that merchant location.

The profiler 126 also can include information in the user profiles other than merchant and location information. In certain exemplary embodiments, the profiler 126 updates a user's profile based on the information received in an advertisement request associated with the user. For example, the profiler 126 may log device use patterns, name and categories of the applications that the user interacts with, detailed information regarding the interactions with the applications, web browsing history, and information regarding how the user uses the end user network device 140, such as information identifying whether the user utilizes a data plan of a mobile telephone or information identifying whether the user plays games or listens to music using the end user network device 140. The user profile also may include information regarding the user's end user network device 140, such as information identifying the type of end user network device 140, the capabilities of the end user network device 140, and the version of the end user network device 140. The user profiles also may include demographic information for the user.

The user profiles also can include merchant and product information obtained from other sources. In certain exemplary embodiments, the end user network device 140 includes a digital wallet that is used to complete purchases and stores information associated with those purchase. In such an embodiment, the profiler 126 may receive this information directly from the digital wallet or via the application provider 170. In certain exemplary embodiments, the profiler 126 is capable of extracting merchant, product, and merchant location information from receipts, bank or credit card statements, or other financial documents of the user. For example, these documents may be stored in the digital wallet, in an account with the information provider 110, or in an e-mail account. In another example, the information provider 110 may be given access (by the user) to the user's e-mail account and can scan the e-mail account for transaction or financial records to extract this information. In yet another example, the user may send documents, such as scan of a receipt, to the information provider 110 to include in the user's profile.

As described in more detail below in connection with block 275 of FIG. 2, the profiler 126 also can receive information regarding what advertisements the user has interacted with and update the user's profile to reflect that the user interacted with the merchants associated with the advertisements that the user interacted with. Thus, the user profile of a user includes an indication of merchants and types of merchants for which the user has shown an affinity.

In certain exemplary embodiments, the profiler 126 uses the list of merchants, the list of merchant categories, and other information stored in the user's profile to generate a set of candidate merchants and a set of candidate merchant categories for the user as discussed in further detail in connection with FIG. 3. The advertisement selection engine 121 uses the information stored in the user's profile and the information received with the advertisement request to select advertisements to transmit to the end user network device 140. Generally, the advertisement selection engine 121 selects advertisements that are more likely to be selected by the user. In some embodiments, the advertisement selection engine 121 considers a bid price for each advertisement along with a predicted clickthrough rate to select advertisements that provide the most value to the information provider 110.

In certain exemplary embodiments, the advertisement selection engine 121 compares the set of candidate merchants and the set of candidate merchant categories to the merchant and merchant categories for advertisements stored in the advertisement repository 123 to select advertisements in which the user may be interested. For example, if an advertisement is for a merchant that is included in the user's set of candidate merchants, then that advertisement may be selected or rated higher than an advertisement for a merchant that is not included in the set of candidate merchants. The set of candidate merchants and the set of merchant categories can be used in addition to the information received in the advertisement request to select advertisements that are likely to be interesting to the user.

The set of candidate merchants and/or set of candidate merchant categories also can be used to reduce the number of available advertisements for the user. In one example, advertisements that are associated with a merchant and a merchant category that are not included in the set of candidate merchants and the set of candidate merchant categories may be eliminated from consideration by the advertisement selection engine 121.

In certain exemplary embodiments, the number of visits and interactions for a merchant is used to rank or score advertisements for a user. For example, an advertisement for a merchant that the user visited only once may be ranked lower than an advertisement for a merchant that the user visits frequently. Similarly, an advertisement for a merchant whose advertisements the user rarely selects may be ranked lower than an advertisement associated with a merchant whose advertisements the user often selects.

The advertisement selection engine 121 also can consider inventory information for a product to select advertisements. For example, the advertisement selection engine 121 may determine from location information included in the advertisement request that the user is within a certain distance of a merchant that has excess inventory of a product. In response, the advertisement selection engine 121 may select an advertisement for that product and that merchant having the excess inventory of the product. The merchants that provide advertisements via the advertisement distribution system 120 can provide inventory information to the advertisement distribution system 120, for example, on a periodic basis.

In one particular example of the advertisement selection process, the advertisement selection engine 121 can use the current location of the user along with the set of candidate merchants and information regarding the mobile application to select from available advertisements in the advertisement repository 123. For example, if the mobile application is a restaurant reservation application and the user (as determined by the location information associated with the user device 140) is proximal to a restaurant where the user often dines or another location in a chain of restaurants where the user often dines, then the advertisement selection engine 112 may select an advertisement or other content associated with that restaurant or chain of restaurants.

In another particular example, the advertisement selection engine 121 may select advertisements for merchants that are include in the user's profile or that has exceeded a number of visits to that merchant based on information stored in the user's profile. For example, if a user has visited a particular grocery store a certain number of times, the advertisement selection engine 121 may select a promotional offer for that grocery store to serve as an advertisement. Or, the advertisement selection engine 121 may select an advertisement for a competitor of a merchant that is included in the user's profile or that has been visited by the user a predetermined number of times. For instance, a competitor may want to send a promotional offer to a user to entice that user to visit a location of the competitor instead. In another example, if two competing merchants are represented in the user's profile, the advertisement selection engine 121 may select an advertisement for one of the merchants based on certain criteria. For instance, if one of the merchants has been visited more times by the user, then the other merchant having less visits may want to send promotional offer to the user.

The advertisement selection engine 121 also may select advertisements for products based on information stored in the user's profile. For example, a manufacturer of a particular product may want to send an advertisement or promotional offer to a user that is known to purchase a competing product based on information stored in the user's profile. In another example, the advertisement selection engine 121 may select advertisements for accessories to a product purchased by the user as noted in the user's profile.

The advertisement selection engine 121 also may select the format in which the selected advertisements are displayed. The advertisement selection engine 121 may select from multiple available formats based on the same or similar criteria used to select the advertisements. For example, one exemplary format for displaying advertisements includes displaying a single product from one or multiple advertisers 105. This exemplary format may display an image for the product and a price at which each respective advertiser 105 is offering the product. Another exemplary format includes a set of similar products to be displayed in a single or small number of advertisement units. Yet another exemplary format includes a set of products and sale information, coupons, discounts, or promotional offers focused on displaying relevant promotion information as the primary advertisement unit. Yet another exemplary format includes a set of related products, for example, a primary product and one or more accessories, to be displayed as a single advertisement unit. Yet another exemplary format includes a larger set of products in a sorted order for display as a list of advertisement units.

In certain exemplary embodiments, the advertisement selection engine 121 selects the format for displaying the selected advertisements using information regarding the mobile application, such as category for the mobile application, information regarding the user, such as user profile, user history, and user interests, information regarding the advertisements, such as advertisement category and type of advertisement, and history of the user's interaction with advertisements, such as user advertisement selections and users advertisement views using the mobile application.

In block 240, the information provider network device 110 transmits information regarding the selected advertisements ("advertisement selection information") to the application provider 170. For example, the advertisement selection information can include information sufficient to enable the application provider 170 to cause the advertisements to be displayed or otherwise presented by the application interface 143. In certain exemplary embodiments, the advertisement selection information includes information that identifies the selected advertisements such that the application provider 170 or the end user network device 140 can retrieve a copy of the advertisements from the respective advertisers 105, such as from an advertisement repository (not shown) of the advertiser 105.

In block 245, the application provider 170 retrieves the content requested in block 215. For example, a weather application running on the end user network device 140 may request weather information in the location of the end user network device 140. In response, the application provider 170 may access the requested weather information from a database or other storage device. In block 250, the application provider 170 transmits the requested content and the advertisement selection information to the end user network device 140.

In block 250, the end user network device 140 receives the content and advertisement selection information transmitted by the application provider 170. In block 255, the end user network device 140 presents the content and the selected advertisements via the application interface 143. For example, the content and selected advertisements can be displayed together in a display area. In certain exemplary embodiments, the selected advertisements are displayed along the perimeter of the display area 145 that displays the content so not to interfere with the content. For example, as illustrated in FIG. 1, the advertisements 147*a*-147*c* are displayed on one side of the display area 145.

Many other formats and techniques also can be used, as desired by the user, the application provider 170, the information provider 110, and the advertiser 105. For example pop-up windows, pop-under windows, and/or banner ads, or other display formats can be used. Additionally, the selected advertisements can be displayed while the application provider 170 retrieves the requested content or after the application provider 170 has transmitted the requested content. Thus, the advertisement selection information can be transmitted from the application provider 170 to the end user network device 140 separate from the requested content.

Regardless of how the selected advertisements are displayed, when the user interacts with the advertisements in block 260, such as by clicking on the display of the advertisement or by hovering a cursor over the advertisement, the end user network device 140 transmits a request for additional information from the advertiser 150, such as by following a link to a web page selected by the advertiser 105, as well as transmits information regarding the interaction to the information provider network device 110 in block 265. For example, when a user clicks on a displayed advertisement, the end user network device 140 may process HTML code that causes a web browser window to open with additional information relating to the request, such as a printable coupon, a display advertisement, or a selected page of the advertiser's web site. In certain exemplary embodiments, interacting with the advertisements can cause a change to an account of the user with the advertiser 105, such as by adding an item for purchase to the user's virtual shopping cart of the advertiser's electronic commerce web site, or by applying a discount to one or more items in the user's shopping cart (including items subsequently added to the shopping cart).

In block 270, the advertisement distribution system 120 updates the advertisement index 122, or other storage device, with information regarding the interaction with the advertisement. For example, the advertisement distribution system 120 can update the advertisement index 122 to indicate that the advertisement was hovered over or clicked on. In addition, if any advertisements were displayed but not interacted with, the advertisement distribution system 120 can update the advertisement index 123 to reflect that the advertisement did not result in any interaction. This information can be used to improve the performance of subsequent advertisement selections, for determining a fee to be charged to the advertiser 105, or for other purposes.

In block 275, the profiler 126 updates the profile for the user in the profile index 127 to indicate the merchant and merchant type associated with the advertisement that received an interaction. For example, if the user clicked on an advertisement for a car dealership, the profiler 126 may update the profile of the user to reflect that the user interacted with an advertisement for that dealership and that the user interacted with an advertisement in a car dealership category or type of merchant. As discussed above, the profile index 127 can include, for each user, a list of merchants that the user has visited or has interacted with via one or more advertisements and a list of merchant types or categories of merchants that the user has visited or interacted with. The profiler 126 can update these lists based on the information regarding the interaction with the advertisement. The profiler 126 also can update the set of candidate merchants and merchant types to which the user may be more responsive based on the updated lists.

After block 275, the method 200 ends. Of course, the application provider 170 can continue to receive requests for content and deliver requested content and advertisements to end user network devices 140.

Figure 3:
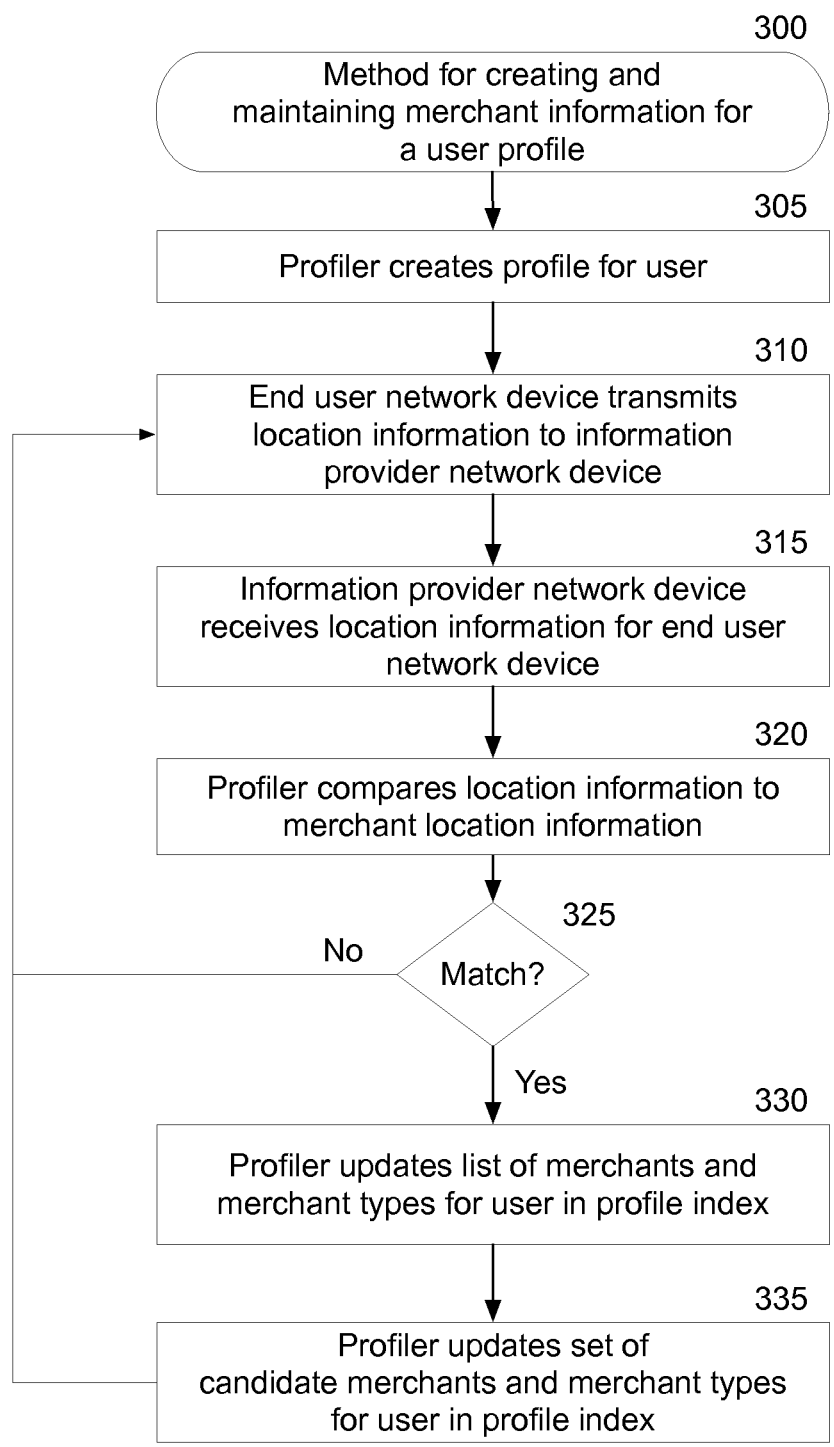
FIG. 3 is a block flow diagram depicting a method for creating and maintaining merchant information for a user profile, in accordance with certain exemplary embodiments.

FIG. 3 is a block flow diagram depicting a method 300 for creating and maintaining merchant information for a user profile, in accordance with certain exemplary embodiments. The method 300 is described with reference to the components illustrated in FIG. 1.

In block 305, the profiler 126 creates a profile for a user in the profile index 127. In certain exemplary embodiments, the profiler 126 creates the profile in response to the user registering to receive advertisements from the advertisement distribution system 120. In certain exemplary embodiments, the profiler 126 creates the profile in response to the user registering for an account with the application provider 170 or in response to the user downloading a mobile application from the application provider 170 to the end user network device 120. For example, the application provider 170 may provide an anonymous identifier for the user and transmit that anonymous identifier to the advertisement distribution system 120 with a request to create an account for the user. The anonymous identifier can be arbitrary or otherwise not capable of being used by a third party or by the information provider 110 to identify the user to which the identifier relates. Therefore, the identifiers can be used within the system 100 as anonymous identifiers of the users. The anonymous identifiers can be replaced with new identifiers periodically to further enhance privacy protections.

The profiler 126 creates a list of merchants, a list of merchant categories, a set of candidate merchants, and a set of candidate merchant categories and stores this information in the profile index 127. Typically, these lists and sets of data are unpopulated when the account is initialized and are populated based on user actions, such as visiting a merchant or interacting with an advertisement associated with a merchant.

In certain exemplary embodiments, the user's profile also includes information that identifies the end user network device 140 associated with the user, such as a mobile telephone number for the end user network device 140. This information can be used to help log the user's location and update the user's profile. The user may be given the opportunity to opt out of or limit the capabilities of this feature.

In block 310, the end user network device 140 obtains current location information indicating the current location of the end user network device 140 and transmits the location information to the information provider network device 110. For example, the end user network device 140 may include a GPS device installed thereon and the location information is obtained from the GPS device. In another example, the user may enter a current location manually via the application interface.

In certain exemplary embodiments, the end user network device 140 transmits location information to the information provider network device 110 on a periodic basis, such as once every minute. In certain exemplary embodiments, the end user network device 140 transmits location information to the information provider network device 110 in response to a request. For example, the information provider network device 110 may issue a request for the current location of the end user network device 140 on a periodic basis or when a content request is communicated or received from the end user network device 140.

In certain exemplary embodiments, the end user network device 140 transmits location information in response to the end user network device 140 being located in or proximal to a merchant. For example, the end user network device 140 may include a database of merchant locations and location information may be compared to the database periodically. If the location of the end user network device 140 matches or is proximal to a merchant, then the end user network device 140 can transmit the location information and/or information identifying the merchant that the end user network device 140 is located at or near.

In certain exemplary embodiments, rather than receiving location information directly from the end user network device 140, the information provider network device 110 may receive location information via the application provider 170 or another source. For example, the application provider 170 may obtain information regarding the location of the end user network device 140 with a request for content and, in turn, provide the location information to the information provider network device 110. Alternatively, a network providing service to the end user device 140 can determine the location of the end user device 140 and can provide that location information to the information provider network device 110.

In block 315, the information provider network device 110 receives the location information identifying the current location of the end user network device 140. In block 320, the profiler 126 compares the location information to a database or another storage device containing location information for a multitude of merchants to determine whether the end user network device 140 is at or near one of the merchants. In block 325, if the profiler 126 determines that the end user network device 140 is located at or near one of the merchants, the method 300 follows the "Yes" branch to block 330. Otherwise, the method 300 follows the "No" branch to block 310 where the end user network device 140 again transmits location information to the information provider network device 110.

In block 330, the profiler 126 updates the profile for the user with information regarding the merchant that user network device 140 is determined to be at or near ("matching merchant"). If the matching merchant was not previously on the list of merchants for the user, the profiler 126 adds the information identifying the matching merchant to the list of merchants in the user's profile. If the matching merchant is already included in the list of merchants in the user's profile, the profiler 126 may update a count for the number of times the user has visited the matching merchant. Similarly, the profiler 126 updates the list of merchant types based on the type or category of the matching merchant. The profiler 126 may update a count for that type or category of merchant.

In block 335, the profiler 126 updates the candidate set of merchants and merchant types in the user's profile based on the updated list of merchants and the updated list of merchant types. The profiler 126 can use the information stored in the user's profile to determine what merchants and types of merchants to include in the candidate set of merchants and the candidate set of merchant categories. For example, the profiler 126 may evaluate the activity of the user with regards to the end user network device 140 (e.g., applications used, types of interactions with the applications, advertisements selected or moused over, or newly installed applications) and with regards to location to determine if there are any new merchants or merchant categories to add the candidate sets. In one example, if a user has increased travel in a certain area, merchants or other entities in that area may be added to the candidate set of merchants.

In certain exemplary embodiments, a model or set of rules is used to generate the candidate set of merchants and the candidate set of merchant categories. In one example, the information in a user's profile is input to a model trained on using training data to generate the candidate set of merchants and the candidate set of merchant categories.

GENERAL

The exemplary methods and blocks described in the embodiments presented previously are illustrative, and, in alternative embodiments, certain blocks can be performed in a different order, in parallel with one another, omitted entirely, and/or combined between different exemplary methods, and/or certain additional blocks can be performed, without departing from the scope and spirit of the invention. Accordingly, such alternative embodiments are included in the invention described herein. For example, advertiser distribution system 120 may be combined with the advertiser device 105 or the application provider device 170, whereby the advertiser device 105 of the application provider device 170 provides the advertisement selection information directly to the end user device 140.

The invention can be used with computer hardware and software that performs the methods and processing functions described above. As will be appreciated by those having ordinary skill in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays ("FPGA"), etc.

Although specific embodiments of the invention have been described above in detail, the description is merely for purposes of illustration. Various modifications of, and equivalent blocks corresponding to, the disclosed aspects of the exemplary embodiments, in addition to those described above, can be made by those having ordinary skill in the art without departing from the spirit and scope of the invention defined in the following claims, the scope of which is to be accorded the broadest interpretation so as to encompass such modifications and equivalent structures.

What is claimed is:

1. A computer-implemented method to distribute contextual advertisement content for display in mobile applications, comprising, by a computer:
    receiving, from an application executing on a mobile network device, a request for an advertisement to be presented in the application to a user associated with a user profile, the request comprising a current request location of the mobile network device;
    identifying a first merchant located proximal to the current request location of the mobile network device;
    identifying a second merchant located proximal to the current request location of the mobile network device;
    determining, from the user profile, that a total number of visits by the user to the first merchant is less than a total number of visits by the user to the second merchant;
    selecting an advertisement of the first identified merchant from an advertisement index based on the determination; and
    transmitting the selected advertisement to the application for display in the application.

2. The computer-implemented method of claim 1, further comprising:
    determining a category of product associated with each identified merchant; and
    adding information regarding the category of product to the user profile,
    wherein the selecting step further comprises selecting the advertisement from available advertisements based on merchant identity information and the category of product in the user profile.

3. The computer-implemented method of claim 1, further comprising:
    receiving information regarding an advertisement with which the user interacted via the mobile network device, the advertisement being associated with a merchant; and
    adding information regarding the merchant associated with the advertisement with which the user interacted to the user profile,
    wherein the selected advertisement is further based on information in the user profile regarding the merchant associated with the advertisement with which the user interacted.

4. The computer-implemented method of claim 1, wherein the selecting step further comprises selecting the advertisement based on available inventory of a selected product associated with the selected advertisement at the identified merchant.

5. The computer-implemented method of claim 1, further comprising receiving information regarding the user's interaction with the application, wherein the selected advertisement is selected based further on the information regarding the user's interaction with the application.

6. The computer-implemented method of claim 1, wherein the selected advertisement comprises at least one of a coupon or a discount.

7. The computer-implemented method of claim 1, further comprising receiving information regarding one or more additional applications installed on the mobile network device, wherein the selected advertisement is selected further based on the information regarding the one or more additional applications.

8. The computer-implemented method of claim 1, further comprising receiving information regarding the mobile network device, wherein the selected advertisement is selected further based on the information regarding the mobile network device, and wherein the information regarding the mobile network device comprises at least one of information regarding capabilities of the mobile network device and mobile network device version information.

9. The computer-implemented method of claim 1, further comprising:
    receiving information regarding a past transaction completed by the user of the mobile network device; and
    adding the information regarding the transaction to the user profile, wherein the selecting step further comprises selecting an advertisement based on the past transaction.

10. A computer program product, comprising:
    a computer-readable medium having computer-executable program instructions embodied therein that when executed by a computer cause the computer to distribute contextual advertisement content for display in mobile applications, the computer-executable program instructions comprising instructions to:
    receive, from an application executing on a mobile network device, a request for an advertisement to be presented in the application to a user associated with a user profile stored on the computer, the request comprising a current request location of the mobile network device;
    identify a first merchant located proximal to the current request location of the mobile network device;
    identify a second merchant located proximal to the current request location of the mobile network device;
    determine, from the user profile, that a total number of visits by the user the first merchant is less than a total number of visits by the user to the second merchant;
    select an advertisement of the first identified merchant from an advertisement index based on the determination; and
    transmit the selected advertisement to the mobile network device for display in the application.

11. The computer program product of claim 10, further comprising instructions to:
    determine a category of product associated with each identified merchant; and
    add information regarding the category of product to the profile associated with the user, wherein the advertisement is selected from available advertisements based on the identified merchant and the category of product in the profile.

12. The computer program product of claim 10, further comprising instructions to:
receive information regarding an advertisement with which the user interacted via the mobile network device, the advertisement being associated with a merchant; and
add information regarding the merchant associated with the advertisement with which the user interacted to the user profile,
wherein the selected advertisement is further based on information in the user profile regarding the merchant associated with the advertisement with which the user interacted.

13. The computer program product of claim 10, further comprising instructions to:
select a format for presenting the selected advertisement based at least on information regarding the application and the information contained in the user profile; and
transmit information regarding the selected format, the transmitted information enabling presentation of the selected advertisement via the selected format.

14. The computer program product of claim 10, wherein the selecting step further comprises selecting the advertisement based on an inventory of a selected product associated with the selected advertisement at the identified merchant.

15. The computer program product of claim 10, further comprising instructions to receive information regarding the user's interaction with the application, wherein the selected advertisement is selected based further on the information regarding the user's interaction with the application.

16. The computer program product of claim 10, wherein the selected advertisement comprises at least one of a coupon or a discount.

17. A computer-implemented method to distribute contextual advertisement content based on candidate merchant lists, comprising, by a computer:
receiving, from an application executing on a mobile network device, a request for an advertisement to be presented in the application to a user associated with a user profile, the request comprising a current request location of the mobile network device;
identifying a first merchant located proximal to the current request location of the mobile network device;
identifying a second merchant located proximal to the current request location of the mobile network device;
determining, from the user profile, that a total number of visits by the user to the first merchant is less than a total number of visits by the user to the second merchant;
selecting an advertisement of the first identified merchant from an advertisement index based on the determination; and
transmitting the selected advertisement to the application for display in the application.

18. The computer-implemented method of claim 17, further comprising:
determining a category for each identified merchant; and
adding information regarding the category for the merchant to the user profile.

19. The computer-implemented method of claim 17, further comprising:
receiving information regarding a past transaction completed by the user of the mobile network device; and
adding the information regarding the past transaction to the user profile associated with the user of the network device, wherein the selecting step further comprises selecting the advertisement based on the past transaction.

20. The computer-implemented method of claim 17, wherein the information regarding a transaction is received from one of an electronic version of a receipt, a digital wallet application installed on the network device, and an electronic document stored in an electronic mail ("e-mail") account of the user of the mobile network device.

21. A system to distribute contextual advertisement content for display in mobile applications, comprising:
a storage device; and
a processor communicatively coupled to the storage device, the processor executing application code instructions that are stored in the storage device to cause the system to:
receive from an application executing on a mobile network device a request for an advertisement to be presented in the application to a user associated with the user profile, the request comprising a current request location of the mobile network device;
identify at least one merchant located proximal to the current request location of the mobile network device;
select an advertisement from an advertisement index in response to the request for an advertisement, the selected advertisement being selected at least in part by determining from the user profile that a total number of visits by the user with a first one of the identified merchants is less than a total number of visits by the user to another of the identified merchants; and
transmit the selected advertisement to the application executing on the mobile network device for display in the application.

22. The system of claim 21, further comprising:
determining a category of product associated with each identified merchant;
and adding information regarding the category of product to the user profile,
wherein the selecting step further comprises selecting the advertisement from available advertisements based on merchant identity information and the category of product in the user profile.

23. The system of claim 21, further comprising:
receiving information regarding an advertisement with which the user interacted via the mobile network device, the advertisement being associated with a merchant; and
adding information regarding the merchant associated with the advertisement with which the user interacted to the user profile,
wherein the selected advertisement is further based on information in the user profile regarding the merchant associated with the advertisement with which the user interacted.

24. The system of claim 21, wherein the selecting step further comprises selecting the advertisement based on available inventory of a selected product associated with the selected advertisement at the identified merchant.

25. The system of claim 21, further comprising receiving information regarding the user's interaction with the application, wherein the selected advertisement is selected based further on the information regarding the user's interaction with the application.

26. The system of claim 21, wherein the selected advertisement comprises at least one of a coupon or a discount.

27. The system of claim 21, further comprising receiving information regarding one or more additional applications installed on the mobile network device, wherein the selected advertisement is selected further based on the information regarding the one or more additional applications.

28. The system of claim 21, further comprising receiving information regarding the mobile network device, wherein the selected advertisement is selected further based on the information regarding the mobile network device, and wherein the information regarding the mobile network device comprises at least one of information regarding capabilities of the mobile network device and mobile network device version information.

29. The system of claim 21, further comprising:
receiving information regarding a past transaction completed by the user of the mobile network device; and
adding the information regarding the transaction to the user profile, wherein the selecting step further comprises selecting an advertisement based on the past transaction.

* * * * *